Figure 1:
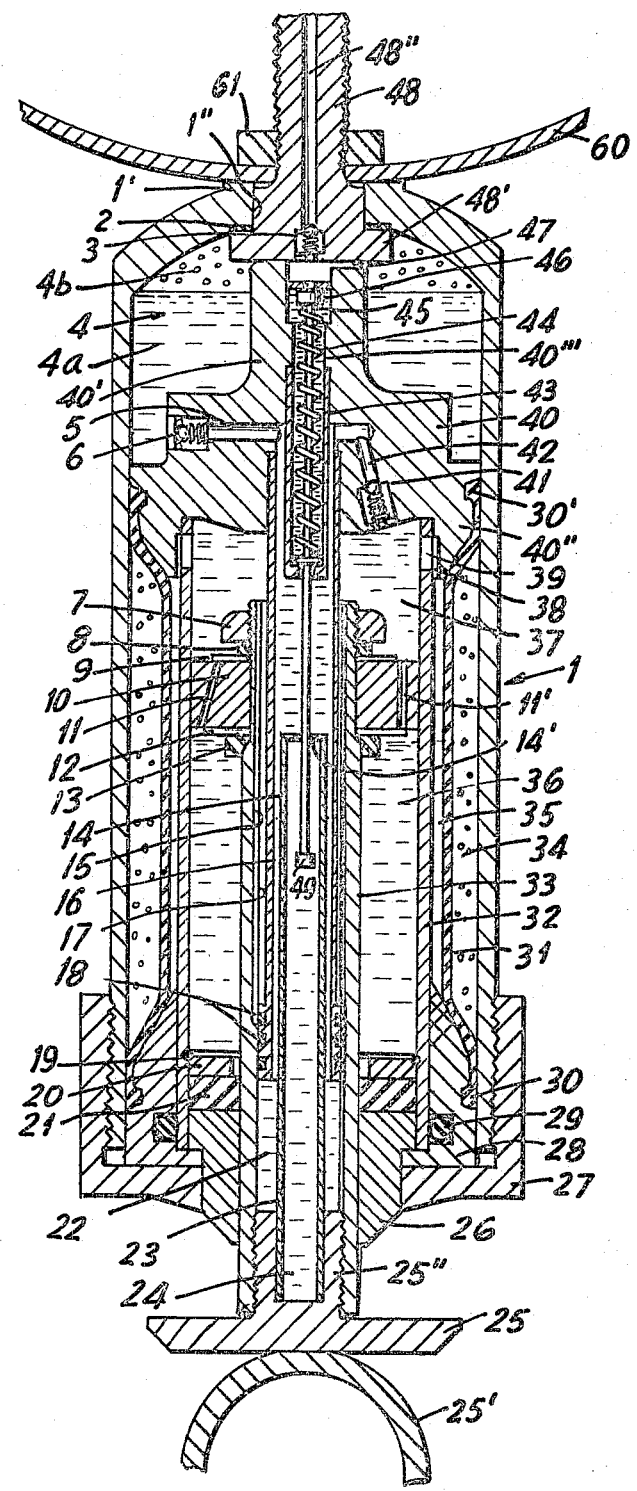

United States Patent

[11] 3,540,716

[72] Inventor Erich Hahn
 Ennepetal-Milspe, Germany
[21] Appl. No. 699,510
[22] Filed Jan. 22, 1968
[45] Patented Nov. 17, 1970
[73] Assignee Firma August Bilstein
 Ennepetal-Altenvoerde, Germany
 a corporation of Germany
[32] Priority Jan. 21, 1967
[33] Germany
[31] No. B90834

[54] SELF-LEVELING HYDRAULIC SHOCK ABSORBER
 10 Claims, 2 Drawing Figs.
[52] U.S. Cl. .................................................. 267/64
[51] Int. Cl. ............................................. B60g 11/28
[50] Field of Search .......................................... 267/64;
 280/96.2

[56] References Cited
UNITED STATES PATENTS
3,387,856 6/1968 Guilhamat et al. ............ 267/64
3,389,903 6/1968 Schmid ......................... 267/64

Primary Examiner—James B. Marbert
Attorney—Karl F. Ross

ABSTRACT: Shock absorber with a dashpot assembly whose cylinder and piston form an extensible unit enclosed within a housing which is rigid with the cylinder and defines therewith an air cushion for the exertion of pneumatic pressure upon a hydraulic working liquid in the cylinder; the tubular piston rod forms a pumping chamber receiving a plunger which is mounted on the inner end of the cylinder, this inner end being constituted by a header which is spaced from the adjoining housing end to form a liquid reservoir and which contains valve-controlled passages for the flow of hydraulic liquid between the reservoir and the working space of the dashpot cylinder by way of the pumping chamber.

INVENTOR:
ERICH HAHN
BY
Karl F. Ross
ATTORNEY

SELF-LEVELING HYDRAULIC SHOCK ABSORBER

My present invention relates to a self-leveling shock absorber for automotive vehicles and the like wherein a dashpot assembly, including a cylinder and a piston respectively connected with two relatively movable parts such as a vehicular chassis and a wheel axle, is combined with pump means for maintaining a substantially constant average spacing between these two parts under varying load conditions. A hydropneumatic suspension unit of this general description, in which the working liquid in the dashpot assembly is held under pressure by a gas cushion, has been disclosed for example in U.S. Pat. No. 3,033,556.

Prior systems of this general description suffer from a variety of disadvantages, not the least of which is their complicated and relatively bulky structure. Also, such systems have hitherto required an extensive network of fluid lines including, in many instances, conduits located outside the cylindrical shock absorber.

It is, therefore, the principal object of my present invention to provide a shock absorber of the general type described which avoids the aforestated drawbacks.

A more particular object is to provide a shock absorber of this type which, by virtue of its compact construction, can be easily assembled and disassembled with all the relatively movable parts disposed in a central body removably inserted in a surrounding cylindrical housing.

According to an important feature of my invention, an improved shock absorber satisfying the aforestated desiderata has a dashpot assembly including a double-acting piston in a cylinder, the latter being closed at one (preferably the upper) end by a header which contains a pair of check valves arranged in tandem in a passage extending between the cylinder chamber and an outside reservoir; the check valves lie on opposite sides of a junction between this passage and a pumping space inside the tubular piston rod partly occupied by a plunger which is rigid with the header. A channel leading from the pumping space to the reservoir is normally blocked by an overflow valve which opens in response to outward extension of the piston beyond a predetermined limit. The peripheral wall of the cylinder is perforated and surrounded by a flexible jacket defining therewith a fluid space which, through the intermediary of this jacket, is under pressure from a surrounding gas cushion confined by the cylindrical housing which also encloses the liquid reservoir and, advantageously, another space for high-pressure gas adjoining the latter; a movable partition, in the form of a flexible membrane or a slider, may be interposed between this gas space and the liquid reservoir, particularly when it is desired to utilize the shock absorber in other than a vertical position.

Figure 2:
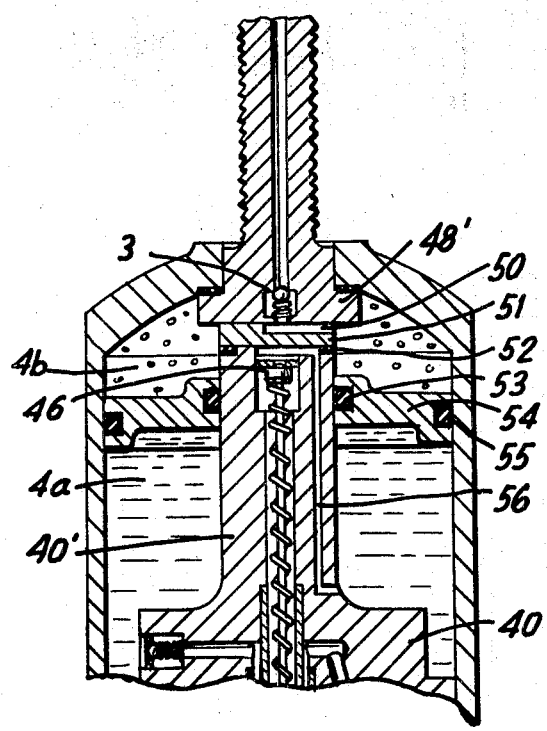

The invention will be described in greater detail with reference to the accompanying drawing in which:

FIG. 1 is an axial sectional view of a shock absorber embodying the present improvement; and FIG. 2 is a fragmentary view similar to the upper part of FIG. 1, illustrating a modification.

The shock absorber shown in FIG. 1 comprises a unitary cylindrical housing 1 centered on a vertical axis, this housing having an open bottom closed by a capnut 27 which is traversed by a plug 26 serving for the guidance of a piston rod 33 axially slidable therein. The projecting lower end of the tubular piston rod 33 is sealed by a screw-threaded boss 25" of a disk 25 rigid with an eye 25' which receives the axle of a vehicle wheel, not shown, the chassis 60 of the vehicle being fastened to the top 1' of housing 1 by a nut 61 engaging a bolt 48 whose head 48' bears from within, via a packing disk 2, upon the housing end 1' and passes upwardly through a bore 1" therein.

A ring 28 occupies the lower end of housing 1 and embraces the lower end of a vertical cylinder 32 coaxial with housing 1; the upper end of this cylinder is tightly fitted into a flange 40" of a header 40 having a neck 40' in contact with the head 48' of bolt 48. Cylinder 32 is surrounded by a yieldable jacket in the form of an elastic membrane 31 which defines with the housing 1 an outer compartment containing an expansile annular air cushion 34; beaded edges 30, 30' of membrane 31 are received in peripheral grooves of ring 28 and header 40, respectively; header flange 40" and ring 28 constitute two external annular shoulders at the ends of cylinder 32 slidably bearing upon the inner housing wall to bound the annular space which accommodates the tubular membrane 31 and which is substantially axially coextensive with the working space of the cylinder surrounded thereby. The variable inner compartment or space 35 confined between cylinder 32 and membrane 31 communicates via an annular recess 38 of header 40 and holes 39 at the upper end of cylinder 32 with the interior of the cylinder constituting the working chamber of a dashpot assembly, the latter including a piston head 10 mounted on the upper extremity of piston rod 33 by means of a nut 7 and washers 8, 13. Piston head 10 has perforations 11, 11' respectively overlain by a resilient blade 9 at the upper face and a similar blade 12 at the lower face of this head to permit a throttled two-way circulation of the working liquid between the upper compartment 37 and the lower compartment 36 of the dashpot chamber. A split ring 19 bears through a metal washer 20 and a packing disk 21 of rubber or the like upon the plug 26 to form a fluidtight lower termination for compartment 36; to insure the fluidtightness of space 35, a sealing ring 29 surrounds the lower end of cylinder 32.

Rigidly seated in the boss 25" of disk 25 is a central tube 14 with a partly closed upper end 14' traversed with clearance by a rod 45 which controls an overflow valve 46, the latter being normally held closed by a coil spring 44 seated in a confronting tube 43 which rigidly depends from header 40 in line with an axial bore 40''' thereof; the lower end of actuating rod 45 carries a head 49 engageable by the top 14' of tube 14 to open the valve 46 upon a sufficient downward displacement of piston assembly 25, 33, 14 beyond a normal working position. Tubes 14 and 43 are spacedly surrounded by a hollow plunger 16 which is also rigidly suspended from header 40 and is provided at its free lower end with sealing rings 18, e.g. of metal, bearing upon the inner wall of piston rod 33 within a pumping chamber 22 bounded by this wall and the tube 14. In the relatively retracted piston position illustrated, the enlarged lower end of plunger 16 seals the cylinder compartments 35, 37 against the pumping chamber 22; in intermediate and extended piston positions, pumping chamber 22 communicates with a set of longitudinal flutes 15 in the piston wall, tapering at their lower ends and registering with an annular space 17 defined by the piston rod 33 and the plunger 16 coaxial therewith. The space 17 opens above the piston head 10 into the compartment 37. A passage 42 in header 40 extends from the channel inside plunger 16, which forms an extension of pumping chamber 22, to the upper cylinder compartment 37, this passage containing a check valve 41 permitting only the outflow of hydraulic liquid under pressure from the pumping chamber to compartment 37 upon a rise of piston rod 33 along plunger 16. Another check valve 6 in a passage 5 of header 40 allows the aspiration of liquid from a reservoir 4, overlying the header 40 within housing 1, into the pumping chamber 22 upon a descent of piston 10, 33 relative to cylinder 32 and plunger 16, this liquid being expelled into compartment 37 upon the subsequent ascent of the piston so as to maintain the working chamber 36, 37 and its extension 35 filled with enough fluid to keep the air cushion 34 in a suitable state of compression. The liquid 4a in reservoir 4 is overlain by another air volume 4b of superatmospheric pressure which may be replenished, if necessary, by way of a central bore 48" in bolt 48 and a check valve 3 in its head 48'. A radial passage 47 in the neck 40' of head 40 vents the space above overflow valve 46 to the air space 4b for the return of excess fluid to the liquid pool 4a whenever the vehicle is so lightly loaded that the telescopic assembly 1, 33 is extended far enough to open the valve 46.

Although pumping chamber 22 communicates with the interior 24 of tube 14 through the mouth 14' thereof, a more direct connection is provided by one or more apertures 23 formed near the lower end of this tube.

If, in the case of very light loading, the membrane 34 is expanded into direct contact with cylinder 32, an undesirable obstruction of fluid passages 39 is prevented by the location of these passages within the recess 38 which is narrow enough to avoid any intrusion of the membrane material between the cylinder and the header 40.

As illustrated in FIG. 2, the liquid and air spaces 4a, 4b may be separated by a sliding partition 54 embracing the neck 40' of header 40 approximately at the level of overflow valve 46. The slider 54 is provided with inner and outer sealing rings 53, 55 to insure fluidtightness. An annular gasket 52 is interposed between the neck 40' and a circular spacer 51 which forms a filling channel 50 for gas introduced via charging valve 3. The space overlying valve 46, disposed above the liquid level in reservoir 4a, communicates with that reservoir through a channel 56 in neck 40'. Spacer 51 may be attached to bolt head 48' by any suitable fastening means not shown. The system of FIG. 2 is especially useful where the shock absorber is to be tilted sharply from its illustrated vertical position.

The header 40 with its passages 5, 40''', 42, 47 may be cast by compression or injection molding. After being fitted with its valves 6, 41, 46 and spring casing 43 containing the biasing spring 44 as well as the rod 45, it can be assembled into a unit with plunger 16, cylinder 32, piston 10, 33, valve-controlling member 14, seal 19—21, 26, membrane 31 and end ring 28. This unit is then introduced into housing 1 whereupon the clamping nut 27 is threaded onto the open housing end and tightened until the neck 40' bears firmly upon bolt head 48'. Finally, the disk 25 with its mounting eye 25' is fitted around the projecting end of tube 14 and then screwed into piston rod 33 to complete the installation. The reverse procedure is followed for dismounting.

I claim:

1. A shock absorber comprising:
    a generally cylindrical unitary housing;
    a dashpot assembly in said housing including a cylinder of substantially smaller diameter fixedly positioned in said housing and a piston axially displaceable in said cylinder, said piston having a piston head dividing the interior of said cylinder into two working compartments and further having a tubular piston rod extending from said piston head axially outwardly through one end of said housing, said piston head being provided with at least one perforation for the throttled flow of hydraulic liquid between said compartments;
    sealing means forming a fluidtight connection between said piston rod and an extremity of said cylinder at said one end, said cylinder being provided at said extremity with a first external annular shoulder slidably engaging the inner periphery of said housing;
    a header at the opposite extremity of said cylinder forming thereon a second external annular shoulder slidably engaging the inner periphery of said housing in spaced relationship with said first shoulder and defining therewith an annular space bounded by said cylinder and said housing, said header being spaced from the other end of said housing and forming therewith a reservoir for said hydraulic liquid, said header having a passage extending between said reservoir and one of said working compartments;
    means forming a pumping chamber in said piston rod, said pumping chamber communicating with said passage and further communicating with the interior of said cylinder at least in certain positions of said dashpot assembly;
    a plunger extending from said header into said pumping chamber for subjecting the hydraulic liquid therein to alternating pressure and suction upon relative reciprocation of said cylinder and said piston;
    valve means in said passage for causing unidirectional flow of hydraulic liquid from said reservoir to said one of said working compartments in response to said reciprocations;
    a tubular membrane in said annular space dividing same into an outer compartment containing a gas cushion and an inner compartment communicating with the interior of said cylinder for placing said hydraulic liquid under pressure from said gas cushion; and
    clamping means at said one end of said housing for securing said cylinder in position therein, said dashpot assembly and said membrane being jointly extractable from said housing via said one end upon removal of said clamping means.

2. A shock absorber as defined in claim 1 wherein said annular space and the interior of said cylinder are substantially axially coextensive.

3. A shock absorber as defined in claim 1 wherein said plunger is hollow and forms a channel leading from said pumping chamber to a junction with said passage, said valve means including a pair of check valves disposed in tandem on opposite sides of said junction.

4. A shock absorber as defined in claim 3 wherein said reservoir includes a liquid space and an adjoining gas space, said header being provided with a bore leading from said channel to said gas space and with an overflow valve in said bore normally blocking same, further comprising control means effective in a relatively extended position of said piston with reference to said cylinder for operating said overflow valve to unblock said bore.

5. A shock absorber as defined in claim 4 wherein said overflow valve is provided with an actuating element extending into said channel, said control means including a member rigid with said piston rod extending into said plunger for engagement with said actuating element in said relatively extended position.

6. A shock absorber as defined in claim 5 wherein said overflow valve is provided with spring means for biasing same into blocking position, said header being fitted with a tubular casing for said spring means extending partly into said plunger, said member being a central tube within said piston rod spacedly confronting said casing, said actuating element comprising a rod passing through said casing into said central tube.

7. A shock absorber as defined in claim 4 wherein said header has a neck projecting toward said other end of said housing, further comprising a slider on said neck forming a movable partition between said liquid space and said gas space.

8. A shock absorber as defined in claim 4 wherein said housing is provided at said other end thereof with a charging inlet to said gas space and with check valve means for preventing the escape of gas from said gas space through said inlet.

9. A shock absorber as defined in claim 4 wherein said tubular piston opens into said one of said compartments for establishing communication between said pumping chamber and the interior of said cylinder in said relatively extended position, said plunger having a free end sealingly bearing upon the inner wall surface of said piston rod in a relatively retracted position of said piston with reference to said cylinder for disconnecting said pumping chamber from said one of said compartments.

10. A shock absorber as defined in claim 1 wherein said header has a flange surrounding part of said cylinder and forming therewith an annular recess narrow enough to prevent intrusion of said membrane into same, said part of said cylinder being apertured for hydraulically connecting the interior of said cylinder with said inner compartment.